United States Patent
Pandey et al.

(10) Patent No.: US 11,392,969 B2
(45) Date of Patent: Jul. 19, 2022

(54) SYSTEM AND METHOD FOR PROFILING AND PREDICTING CUSTOMER BEHAVIOR

(71) Applicant: Fractal Analytics Private Limited, Mumbai (IN)

(72) Inventors: Amit Pandey, Mumbai (IN); Yuvaneet Kumar Bhaker, Mumbai (IN); Aniket Koyande, Dombivli West (IN); Rahul Desai, Mumbai (IN)

(73) Assignee: Fractal Analytics Private Limited, Mumbai (IN)

( * ) Notice: Subject to any disclaimer, the term of this patent is extended or adjusted under 35 U.S.C. 154(b) by 0 days.

(21) Appl. No.: 16/823,492

(22) Filed: Mar. 19, 2020

(65) Prior Publication Data
US 2021/0241292 A1    Aug. 5, 2021

(51) Int. Cl.
*G06Q 30/02* (2012.01)
*G06N 3/08* (2006.01)
*G06N 3/04* (2006.01)

(52) U.S. Cl.
CPC ....... *G06Q 30/0202* (2013.01); *G06N 3/0445* (2013.01); *G06N 3/0454* (2013.01); *G06N 3/08* (2013.01)

(58) Field of Classification Search
CPC ............. G06Q 30/0202; G06N 3/0445; G06N 3/0454; G06N 3/08
USPC ....................................... 705/7.31
See application file for complete search history.

(56) References Cited

U.S. PATENT DOCUMENTS

| | | | |
|---|---|---|---|
| 2014/0081846 A1* | 3/2014 | Gallagher | G06Q 40/02 705/39 |
| 2014/0164093 A1* | 6/2014 | Libman | G06Q 30/0277 705/14.39 |
| 2017/0140418 A1* | 5/2017 | Yadagiri | G06Q 30/0244 |
| 2019/0114334 A1* | 4/2019 | Gunther | G06F 16/2358 |
| 2020/0126126 A1* | 4/2020 | Briancon | G06Q 30/0269 |

OTHER PUBLICATIONS

Zhou, et al., An Approach for Overlapping and Hierarchical Community Detection in Social Networks Based on Coalition Formation Game Theory, 42 Expert Systems with Applications 24, 9634-9646 (2015) (Year: 2015).*

Mozilla Development Network, Django Introduction (captured Feb. 18, 2018), available at https://web.archive.org/web/20170218035246/ https://developer.mozilla.org/en-US (Year: 2018).*

* cited by examiner

*Primary Examiner* — Charles Guiliano
(74) *Attorney, Agent, or Firm* — Wiley Rein LLP

(57) ABSTRACT

The present disclosure describes a system and method for profiling and predicting customer behavior using machine learning. The system for profiling and predicting customer behavior uses all available signals from each individual customer across digital channels to build predictive artificial intelligence algorithms to create customer genome markers that predict the likelihood that specific customer will respond to digital actions.

21 Claims, 8 Drawing Sheets

SYSTEM AND METHOD FOR PROFILING AND PREDICTING CUSTOMER BEHAVIOR

RELATED APPLICATIONS

This application claims priority benefit of Indian Patent Application No. 202021005039, filed Feb. 5, 2020, which are incorporated entirely by reference herein for all purposes.

FIELD

The present invention relates to a data processing system and method. In particular, the present invention relates to a system and method for analyzing data to understand customer behavior.

BACKGROUND ART

The traditional approach of marketing uses segmentation, clustering, and classification algorithms to create segments or clusters of customers, and design the marketing strategy around them. Current marketing aspirations strive to drive messaging at the individual level. However, they are constrained either in technical approaches for efficiently processing data at a certain granular level, or statistical processes and last mile implementation for effectively reaching out to individual customers.

Predictive analysis is the use of data, statistical algorithms and machine learning techniques to identify the likelihood of future outcomes based on historical data. Using predictive techniques guided by machine learning and artificial intelligence, predictive modeling helps assess future customer behaviors by identifying patterns and similarities between variables in the data. Running customer data through predictive models can help better anticipate customer behavior to make informed marketing strategy.

Currently, when using artificial intelligence algorithms to discover patterns in behavior exhibited by customers, a well-defined target variable and training set are required for models to build. There is therefore a need to have a good understanding of a subset of a population before trying to understand the larger population. Conventionally, predictive models are built across population. Thus, only static customer characteristics can be fed in as input variables. Additionally, individual transactions do not typically impact the output immediately as their overall averaged impact is seen during scoring. Furthermore, models need to be refreshed to reflect change in customer behavior. Typically requires huge historical data to be present to score/update.

Therefore, it would be beneficial to have a system and method for profiling and predicting customer behavior using machine learning in an adaptive and automated way.

SUMMARY OF THE INVENTION

The present invention provides a system and method for profiling and predicting customer behavior using machine learning. This present invention uses all available signals from each individual customer across digital channels to build a machine learning model to generate customer genome markers, known as business parameters, that predict the likelihood that a specific customer will respond to digital actions. Each customer genome marker has an assigned probability score to predict behavioral intentions. The probability score is indicative importance of the contribution of the genome towards the overall behavioral intentions. Examples of such customer genomes are email propensity, risk aversion index, or market sensitivity.

The object of the present invention is to enable sales, marketing and analytics users to drive specific activities to acquire targeting customers, retain churn/dormancy predictions, and cross-sell/up-sell optimized products/services to each targeting customer.

This approach differs from traditional targeted segmentation in its ability to predict future behaviors, attributes and preferences in an adaptive way where the models are automatically updated with each customer action. By combining customer genome predictions with product attributes matching, the present invention enables personalized interactions with customers by delivering the right product or services through the right channel at the right time.

Compared to the tradition machine learning modeling approach which requires a well-defined target variable and training set to build, the present invention works off hypothesis and fuzzy definitions. The present invention is a customer level model because dynamic individual customer behavioral characteristics influencing the manner labels are continuously updated. Therefore, the impact of individual transactions is observed with a shorter latency and up-to-date understanding is possible. Further, the present invention adapts with time, so no refreshes are required, unless new variables/factors are seen. Thus, refreshes are reduced considerably. In addition, updates would be done only using the most recent data in the present invention, and thus there is no need to store past history of data.

One exemplary embodiment of the invention herein provides a system for profiling and predicting customer behavior, implemented by one or more servers, comprising:

a system database configured to retrieve data of a customer from a plurality of data sources for a customer;

a data science engine configured to process data fed by the system database to generate a plurality of customer genome markers and predict behavioural intention of the customer;

a deep learning engine configured to receive data fed from the system database to train a model;

a web application and an application program interface (API) configured to provide a user interface; and a master controller configured to enable programmable control of the system database, the data science engine, and the deep learning engine;

wherein the system database is configured to generate a harmonized single view of the customer;

wherein the master controller is configured to create a schedule for scheduling data retrieving, transformation, validation, and training; and wherein the deep learning engine comprise an ensemble of deep learning algorithms consisting of convolutional neural network, deep reinforcement learning, and recurrent neural network.

Another exemplary embodiment of the invention herein provides a method for profiling and predicting customer behavior, comprising:

retrieving, via the system database, data from a plurality of data sources for a customer;

processing data, via the system database, to generate a harmonized single view of the customer;

feeding data to the deep learning engine to train a model;

providing, via the web application, a user interface and the application program interface (API);

generating, via the data science engine, a plurality of customer genome markers;

making, via the data science engine, predictions; and enabling, via the master controller, programmable control of the system database, the data science engine, and the deep learning engine;

wherein the master controller is configured to create a schedule for scheduling data retrieving, transformation, validation, and training; and wherein the deep learning engine comprise an ensemble of deep learning algorithms consisting of convolutional neural network, deep reinforcement learning, and recurrent neural network.

BRIEF DESCRIPTION OF THE DRAWINGS

The invention will be described in more detail below on the basis of a drawing, which illustrates exemplary embodiments. In the drawing, in each case schematically.

DETAILED DESCRIPTION OF THE EMBODIMENTS

Figure 1:
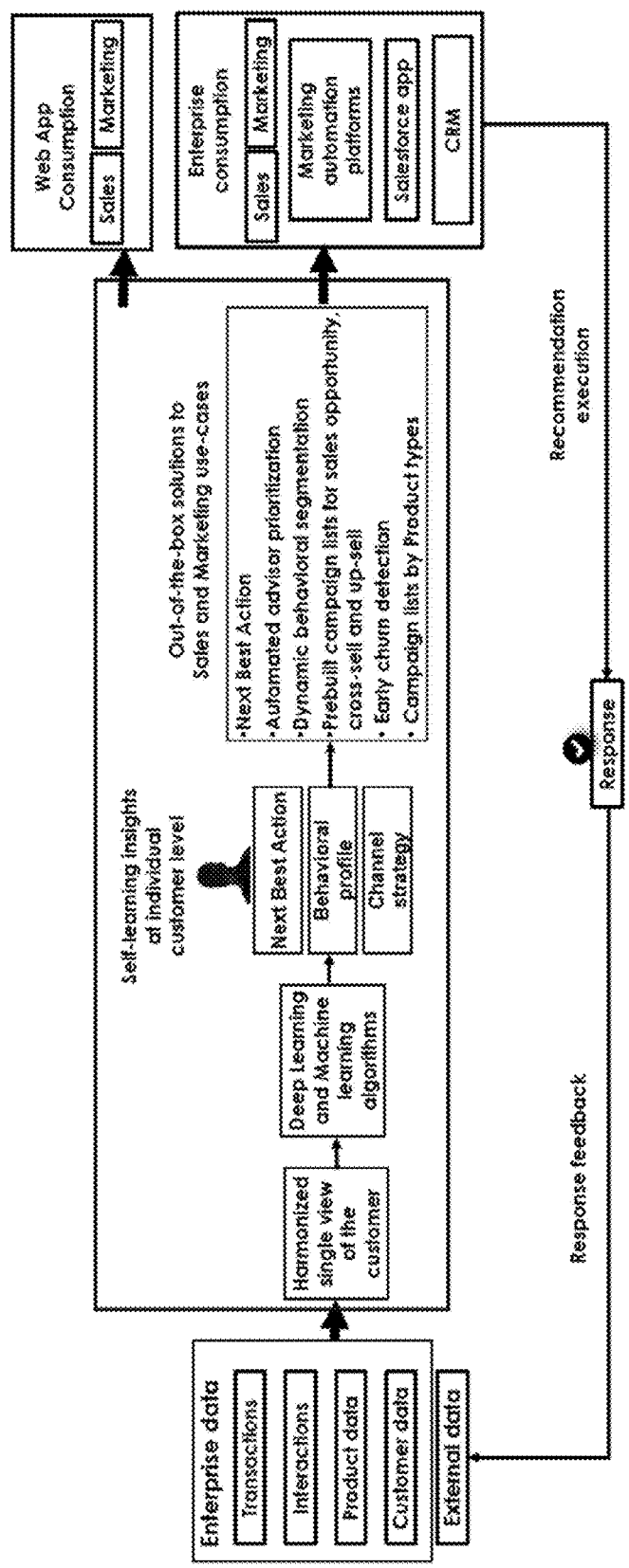
FIG. 1 is a flowchart outlining an exemplary operation of the present invention.

It should be understood that this invention is not limited to the particular methodology, protocols, and systems, etc., described herein and as such may vary. The terminology used herein is for the purpose of describing particular embodiments only, and is not intended to limit the scope of the present invention, which is defined solely by the claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The term "server" refers a computer program or a device that provides functionality for other programs or devices.

The term "entity" in the present invention is like traditional definition of an "entity" in database. It is a topic/subject for which information is stored. The examples of an entity comprise transactions, customer demographics, products, funds, distributors, demographics, and interactions.

The term "action-variable" refers to a set of data points that are used to define a predictable action. Examples of predictable actions would be fund recommendations, product recommendation, and communication strategy, and recommendation for specific categories from a set of fund categories.

The term "target-variable" refers to a data point for which the prediction has to be made, expressed in terms of an action-variable. For example, a target-variable is a customer who is to be recommended to invest in a particular category of fund. Another example of a target-variable is a distributor who is to be recommended to talk about specific categories of funds with an investor.

The term "granularity" refers to the time-duration for extraction of information regarding an entity or prediction of target-variable under consideration. For example, an entity called transactions has a granularity of monthly, which means the all the information regarding transactions is retrieved every month from the data sources. For a further example, an entity called interactions has a granularity of week, which means the information is retrieved weekly from the available data sources containing Interactions data. The temporal organization of entities and the "target-variable" in the data models are as per the granularity of the "target-variable." For example, if a target-variable is predicted every week, then all the data, including any entity and target-variable, are organized as weekly snapshots. If the granularity for prediction is a month, the data is organized as monthly snapshots.

The term "customer genome" refers to a set of business parameters used to predict domain-related behavioral intentions.

The term "npm (originally short for Node Package Manager)" refers to a package manager for the JavaScript programming language. It is the default package manager for the JavaScript runtime environment Node.js.

The term "Angular" refers to a platform for building mobile and desktop web applications.

The term "Django" refers to a high-level Python Web framework that encourages rapid development and clean, pragmatic design.

The term "convolutional neural network (CNN)" refers to a class of deep neural networks, most commonly applied to analyzing visual imagery. They are also known as shift invariant or space invariant artificial neural networks (SIANN), based on their shared-weights architecture and translation invariance characteristics. They have applications in image and video recognition, recommender systems, image classification, medical image analysis, and natural language processing.

The term "deep reinforcement learning" refers to an algorithm that uses deep learning and reinforcement learning principles in order to create efficient algorithms that can be applied on areas like robotics, video games, finance and healthcare. Implementing deep learning architecture (deep neural networks or etc.) with reinforcement learning algorithms (Q-learning, actor critic or etc.), a powerful model (DRL) can be created that is capable to scale to previously unsolvable problems.

The term "recurrent neural network (RNN)" refers to a class of artificial neural networks where connections between nodes form a directed graph along a temporal sequence. This allows it to exhibit temporal dynamic behavior. Unlike feedforward neural networks, RNNs can use their internal state (memory) to process sequences of inputs. This makes them applicable to tasks such as unsegmented, connected handwriting recognition or speech recognition.

The term "A/B testing" refers a randomized experiment with two variants, A and B. It includes application of statistical hypothesis testing or "two-sample hypothesis testing" as used in the field of statistics. A/B testing is a way to compare two versions of a single variable, typically by testing a subject's response to variant A against variant B, and determining which of the two variants is more effective.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments.

FIG. 1 depicts an exemplary workflow of the present system for profiling and predicting customer behavior. The system retrieves asynchronous data from various sources, including but not limited to, a user data warehouse (enterprise data) or a third-party data source (external data). Specifically, the system retrieves relevant data for a certain entity, for example, transactions, interactions, products, distributors, or funds, from across the data sources. These entity-related data points are then grouped by columns as defined by the logical data model (LDM) and aggregated at the level of granularity, such as weekly, monthly, or quarterly, as prescribed by a user for the target variables. Table 1 is an exemplary logical data model.

TABLE 1

| Transactions | Interactions | Products |
|---|---|---|
| runseq | runseq | runseq |
| custid | custid int | fundid |
| fundid | activitytype | datetime |
| tradeid | activityid | benchmarkindexvalue |
| activitydatetime | activitydatetime | day |
| benchmarkindexvalue | activitydetail | fundagency |
| category | activityduration | fundfamilyname |
| day | activityoutcome | fundname |
| fundagency | campaignname | fundnav |
| fundfamilyname | contenttype | fundorigindate |
| fundname | day | fundrating |
| fundnav | emailidentifier | investmentcategory |
| fundorigindate | mobileappusagetime | investmentcategorycode |
| fundrating | month | month |
| gsales | webdownloadcnt | totalaum |
| investmentcategory | webpageviewcnt | week |
| investmentcategorycode | websessiontime | year |
| month | week | |
| numunits | year | |
| redeem | | |
| totalaum | | |
| week | | |
| year | | |

The column names from the user sources is also converted into standard form as defined by LDM. For example, the present system takes all data points related to an entity, such as transactions, from different tables from a user data warehouse. These data points are then denormalized to form a single source, grouped by customer id and product id, and aggregated at the monthly level, as product recommendations have to be predicted monthly according to the user direction.

Once the data is available in the system as described in the previous step, the system executes an intent-specific 360-degree transformation module (harmonized 360s) to get a single view per intent. This step is to generate a harmonized single view of the customer. For example, if the intents are the Customer, Product, Distributors, or Market, the output would be Customer 360, Product 360, Distributors 360, and Market 360, respectively. The harmonized 360s is equipped with automated feature scaling and standardization to remove any anomalies and outliers, and standardize the features.

Figure 2:
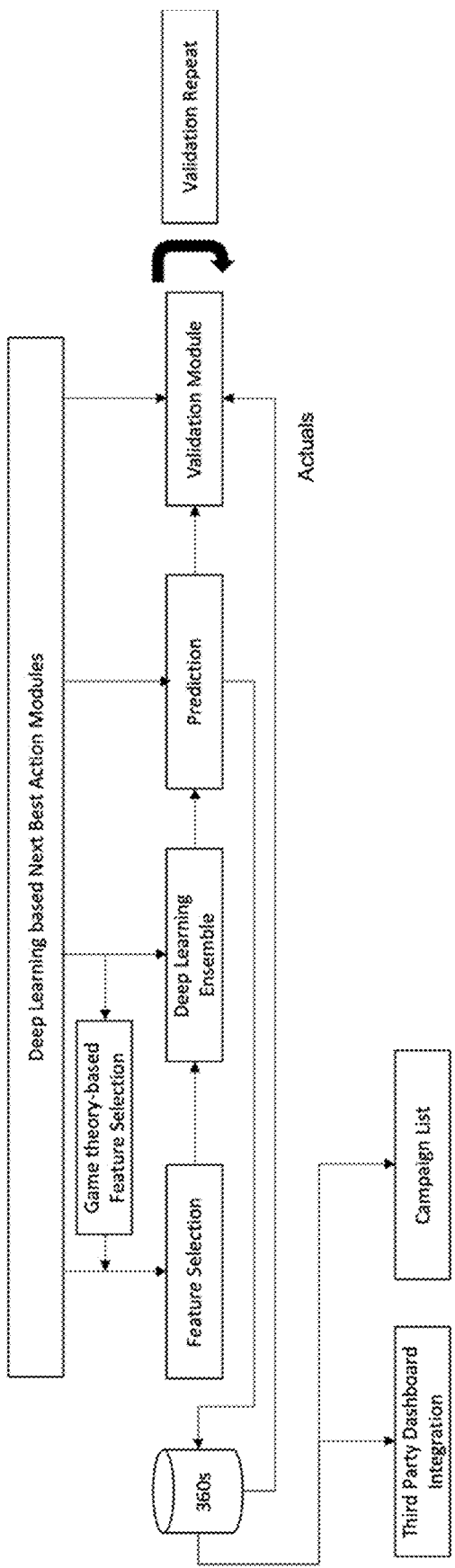
FIG. 2 depicts the workflow of the harmonized 360s.

FIG. 2 depicts a workflow of the harmonized 360s. Deep learning techniques are applied to the harmonized 360s to predict next best action at individual customer level. The process of harmonized 360s comprises four steps.

In Step 1, rules as defined by business are applied to remove any section of consumers/entities (could be a product area) that are not to be considered. Feature set is created from the filtered harmonized 360s. The prediction (next best action) has to be done at the consumer level (mainly customer/patients/decision makers).

In Step 2, the features generated in the Step 1 are fed into an ensemble of deep learning algorithms—convolutional neural network, deep reinforcement learning, recurrent neural network (RNN) to generate additional "outputs" (a series of labels defining consumer characteristics). For example, this could be customer affinity for a brand, a patient psychological state, a patient nutritional preference/limitation, a salesperson interpersonal skill etc.

In Step 3, the output generated in Step 2 are used by the prediction engine to arrive at a recommendation for the next action for the target consumer. The source of these next best actions is governed by the rules of the business and form a set of pool of business-specific recommendations. For example, in product category, the recommendations may be treatment or follow-up options for patient, or set of products to discuss with a financial advisor by a relationship manager of an asset management firm. A salient feature of the present invention is to maintain a test and a control set—allowing internal A/B testing with rules defined by the business. This allow to see how the prediction engine is working. The system enables to use deep reinforcement learning to penalize/reward itself in case the lift/precision underperform/beats the previous prediction cycle.

In Step 4, the next best action prediction modules are used by the business to drive hyper individualized interactions (campaigns). After the end of such campaigns, the input is gathered as to whether the suggested action has been taken by the consumer—could be purchase of a product, add-on, cross-sell, or for decision makers such as—recommending a strategy to a financial advisor for its clients, or for a doctor-recommending best strategy for the patient and so on.

These feedbacks are used by the deep learning ensembles to learn from their mistakes, and further improve the predictions in subsequent campaign automatically without any human intervention.

The harmonized data is used to train the model with deep learning and machine learning algorithms for profiling the customer genome and predicting the target-variable. The customer genome may be a complex data structure that includes a set of domain-related behavioral traits with associated probabilities. The probability score of each customer genome marker is indicative importance of the contribution of the customer genome towards the overall behavioral intention. Examples of such genome markers comprise email propensity, risk aversion index, and market sensitivity. The system employs an automated set of training its models by comparing various error tracking metrics to select the best approach to make the prediction. As a result, an optimum sequence of digital and non-digital interactions, such as next best action, automated advisor prioritization, dynamic behavioural segmentation, prebuilt campaign lists for sales opportunity, early churn detection or campaign lists by product types, are identified for each customer based on the customer genome.

The predictions, as well as the 360s, may be consumed by the user through application program interfaces (APIs) on a Web or Mobile interface, can be written back to the user's data warehouse, or is further analyzed by the in-house business analytics teams through a third-party visualization tool.

The system applies a set of game theory algorithms to track individual feature contribution and eliminate those which are not having any impact. This process is an on-going and continuous improvement in algorithmic features and weights, and repeated at specified-duration, such as three months by default, thus reducing noise and improving prediction.

In the deployment phase, the system process requires at least 36-60 months of data for training, cross-validation, and testing the predictions. Post the deployment, the system retrieves the data incrementally at the level of granularity prescribed for each entity by the user such as daily/weekly/monthly. As an on-going process, the system pulls the data incrementally and computes the probability scores for the genome markers (business parameters) every month, making the "next best action" prediction.

Figure 3:
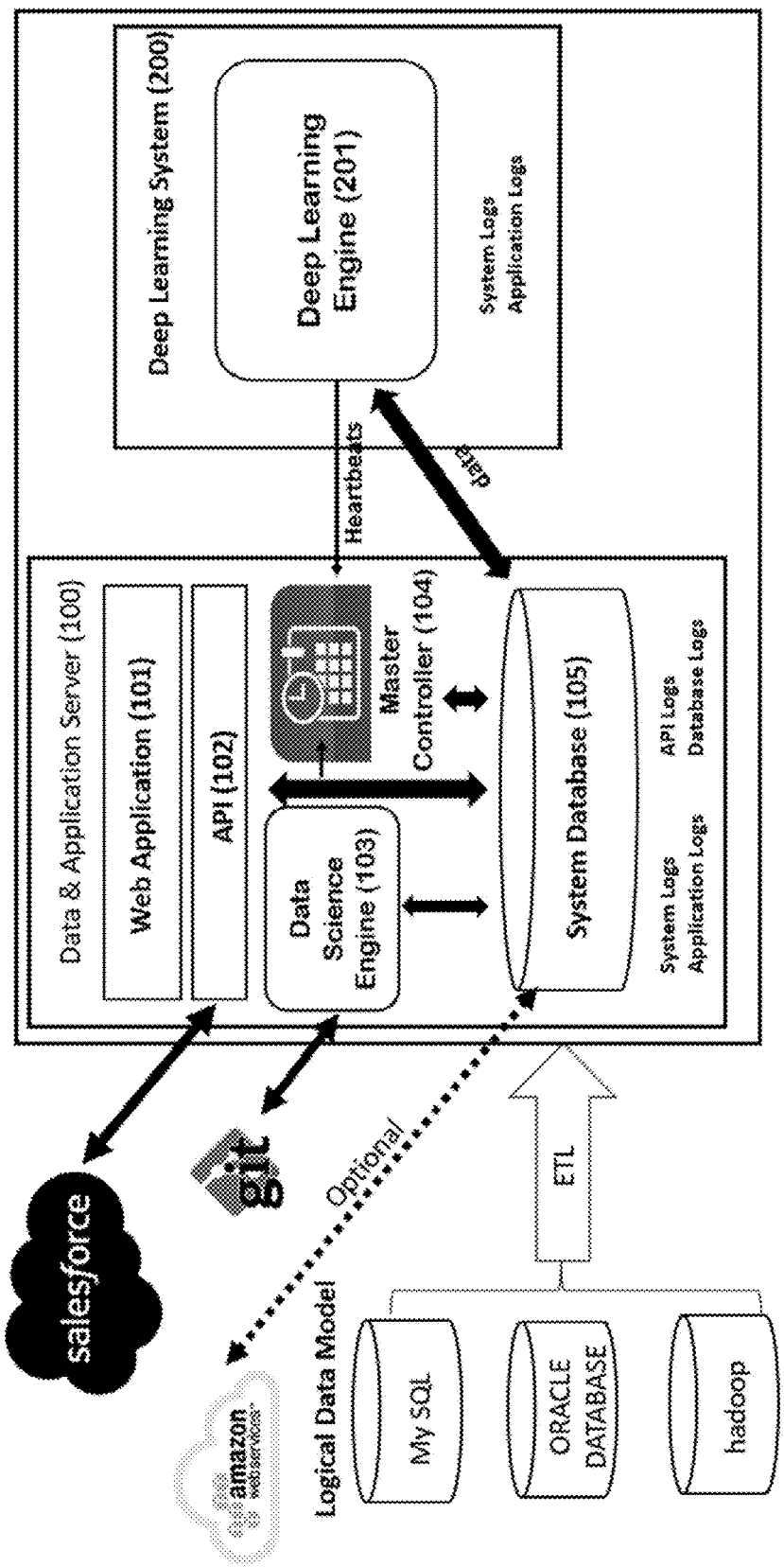
FIG. 3 shows an example customer genome system architecture.

FIG. 3 depicts an exemplary architecture of the system for profiling and predicting customer behaviour. The system comprises a data and application server (100) and a deep learning system (200). The data and application server comprises a web application (101), an application program interface (API; 102), a data science engine (103), a master controller (104), and a system database (105). The deep learning system comprises a deep learning engine (201).

The system database (105) is configured to retrieve asynchronous customer data from various data sources, including but not limited to, a user data warehouse (enterprise data) or a third-party data source (external data). The system database (105) may be implemented, for example, using Cassandra-driver 3.10, which provides reliable, scalable, distributed computing and data storage. The system database (105) may also be implemented via Extraction, Transformation and Loading data (ETL) implementation. External logical data models include, but is not limited to, MySQL, Oracle database, Hadoop, S3, and Excel source. The system database (105) may also receive data from Amazon web-service. Source data may be validated using Talend ETL (ETL MDV). Source data may be loaded in bulk and incremental to the system database (105) by Talend executable jars. Thousand plus features for customers data may be merging and appending using Talend to overcome server limitation with RAM and CPU while working with clients. Runseq level data may be generated for demographics LDM from client static data using Talend ETL. The system database is not thus limited and alternative computing and storage frameworks may be used.

The system database (105) feeds the streaming customer data to the master controller (104), data science engine (103) and deep learning engine (201) for real-time and/or near-real-time processing with regard to inclusions or changes in the customer genomes.

The system database (105) executes an intent-specific 360-degree transformation module to harmonize customer data to create a harmonized single view of the customer, and to remove any anomalies and outliers, and standardize the features.

Figure 4:
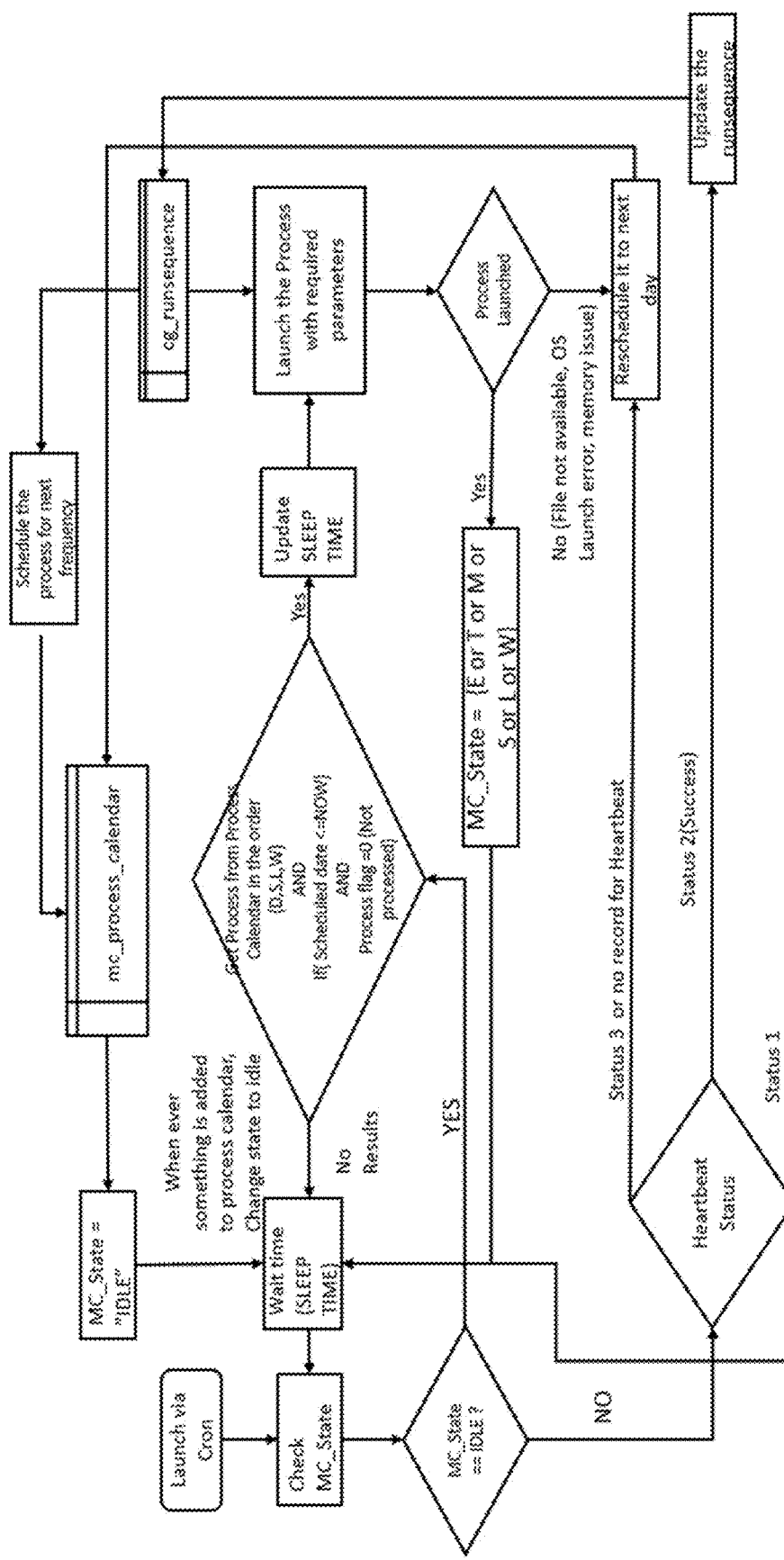
FIG. 4 details the scheduler logics of the Master Controller.

The system process is governed by the master controller (104), which ensures all the processes extraction, transformation, validation, re-training, and re-calibration, are being executed as scheduled. The master controller (104) is the central process in the system's code base that controls the execution of all the other validations, algorithms, web processes that are required for the execution of a run sequence and generation of labels for that run sequence. The master controller (104) allows to schedule processes that run regularly through a schedular logic. FIG. 4 depicts the overall schedular logic/algorithm for the master controller (104).

The step "mc_process_calendar" comprises a set of variables as disclosed in Table 2.

TABLE 2

| Variable | Description | Explanation |
|---|---|---|
| run_year | The year for the run sequence for which the process is going to be executed | YYYY |
| run_month | The month for the run sequence for which the process is going to be executed | Month Number |
| process_type | Type of the Process | D (Data Process) (Independent) In order of execution - V (Minimum Data Validation) E (EDA Process) T (Training Process), M (Miscellaneous Process), S (Signal Preparation Process), L (Label Preparation Process), W (Web Script Execution) F (Final Script) which updates the cg_runseq and adds next runsequence as unprocessed, marking the previous run sequence as processed. |
| target_system | Server on which the code would be executed | ADS - Application & Data Server GPU - Deep learning system |

TABLE 2-continued

| Variable | Description | Explanation |
|---|---|---|
| attempted | Whether the process has been attempted or not | 0 - Not yet attempted<br>1 - Attempted |
| next_attempt_on | The date on which the process is to be attempted | |
| target_process | The identifier for the Target Process | e.g. D1, D2, S1, S2 |
| required_process | The comma separated past process which are required for the current process record to have been completed before the current process can start. If the required process is not completed, the current process is deferred by 5 days. | e.g. "D1, V1, S3" |
| target_description | The full description of the target_process to be run | |
| target_path | The path of the process (for MVP - py (python) files that would be invoked by the master controller | |
| execution_frequency | The frequency at which the process needs to be invoked | Currently supported - Monthly, Daily, Weekly, Quarterly |
| original_attempt_on | The first date on which the process was invoked for a frequency cycle | |
| last_attempt_on | The last date on which the process was invoked in a frequency cycle | |
| status | Result of process being executed | 0 - Not invoked yet and hence no result<br>200 - Executed successfully<br>401 - Failed as decided by Master controller |
| attempt_counter | Running count of the number of attempts in a given frequency cycle | |
| expected_wait_time | Minimum wait time the Master controller has to wait after invoking the process to check the heart beats | For MVP, each process can define their own frequency at which they would send a heartbeat to tell Master Controller that it is still processing. Going ahead it would be a separate thread - regular frequency. |

The step "mc_heartbeat" comprises a set of variables as shown in Table 3.

TABLE 3

| Variable | Description | Explanation |
|---|---|---|
| process_type | Code of Process family | VE, E, S |
| heartbeat_received_on | Date time on which heartbeat was received on | |
| heartbeat_status | Status number as returned by process | 1 = running<br>2 = Success and exiting<br>3 = Failed and exiting |
| target_process | The Process that was running and sending heartbeats | VE01, VE02, E01 |
| Message | Explanatory message sent by the process | |

The step "mc_state" comprises a set of variables as shown in Table 4.

TABLE 4

| Variable | Description | Explanation |
|---|---|---|
| machine | ADS or GPU | |
| status_updated_on | Date time on which the record was inserted | |
| process_id | The code of the process | VE01, VE02, E01 |
| process_type | Code of the process family | VE, E, S |
| run_year | The year of the run sequence | |
| run_month | The month of the run sequence | |
| state | The state code of the system on ADS or GPU | |

The step "cg_runseq" comprises a set of variables as shown in Table 5.

TABLE 5

| Column Name | Description | Explanation |
|---|---|---|
| seq_key | A default key with number 1 | To avoid multiple partition |

TABLE 5-continued

| Column Name | Description | Explanation |
| --- | --- | --- |
| is_processed | Is the runsequence processed | 0 = not processed<br>1 = processed<br>(At any point of time there would be only one unprocessed (0) in the cg_runseq table |
| cg_runseq | The numeric progression of combination of run year and run month | From 0 onwards, 0, 1, 2 . . . |
| cg_rundate | YYYYMM format of the run sequence | |
| execution_date | The date on which the run sequence was processed and closed | |
| run_month | The month of the run sequence | |
| run_year | The year of the run sequence | |

As soon as the master controller is launched it would perform the following activities:
1. reading from configuration file for parameters;
2. archiving the old log file and create a new "mastercontroller.log" file;
3. pulling the current unprocessed run sequence from the cg_runseq table;
4. setting the default state to IDLE in the state table;
5. searching unprocessed jobs in the process calendar table for the given combination of run year and run month as identified from the unprocessed run sequence.

The exemplary configuration file "mc.ini" of the master controller is illustrated as follows.
Location—<downloaded_path>/cg_cpu_setup/master_controller/config/[DB_Params]
This array stores all the database parameters—host, key_space (name of the schema)
[Table_Params]
This array stores all the generic names for master controller tables.
[Program_Params]
This array stores all the program related settings:
1. logging level—DEBUG/INFO/WARNING/CRITICAL/ERROR
2. sleeptime=30 (default waiting time for Master Controller before it can check for jobs if in state IDLE
3. device=ADS/GPU (ADS=Application and Data Server, GPU=Deep learning system)
[Policy_Params]
1. processdelay=60 (how much time in seconds to wait after rescheduling a job to check for next job)
2. validationdelay=2 (multiple of time to wait till Master Controller should decide whether a process has gone rogue and not responding—not sending any heartbeats. E.g. if a process promises to send a heartbeat every 10 minutes as per as "expected_wait_time", if no heartbeat is received after 10× validationdelay period—the process is considered to be nonresponsive.
3. graceperiod=extra time to wait in seconds before checking for heartbeats. This is done to factor in delay of writing any records to heartbeat by the process or by nature of nosql system The log file of the session is mastercontroller.log. Each time the master controller is restarted, the existing mastercontroller.log is archived with the current date time in the form "mastercontrollerYYYYMMDD_HHMMSS.log". The log information is recorded in the form as "Time-|Name|Logging Level|Function Name|Message."

If the master controller does not find a job to be processed it would wait for default period as identified by configuration value "sleeptime" before checking for next job. If the master controller does find a job to be processed, it would do the following:
1. launching the job and passing the parameters to it, including relative path, process type, target process, run sequence, number of run sequence to be executed and called by the master controller flag.
2. inserting a default heartbeat for the process with message "Initial handshake" and flag 1.
3. changing the default wait time from "sleeptime" to the expected_wait_time if the expected_wait_time is less than 10 minutes; otherwise changing the default wait time to 10 minutes if the expected_wait_time is more than 10 minutes.
4. Checking heartbeats table after every time period as set by step 3.

If the process launched returns either a 2, 3 or is not responding, the master controller reschedules the process as follows:
1. The next_attempt_on and original_attempt_on dates would be same for the first job for a frequency cycle.
2. In case the job is executed successfully with a value 200 then a new record would be added where original_attempt_on date would be added by frequency days (e.g. if it is month—then next month) for both the new next_attempt_on and original_attempt_on dates.

An exemplary illustration of a process is shown as follows.
Next attempt on—2 Jan. 2017
Original attempt on—2 Jan. 2017
Last attempt on—null
Attempt counter—0
On success value 21—new record with remaining fields retaining the same values
Next attempt on—2 Feb. 2017
Original attempt on—2 Feb. 2017
Last attempt on—null
Attempt counter—0
If the return value is 31/32/42, which indicates a failure for whatever reason, the process would be scheduled for execution the next day using the next attempt on date by a period of 24 hours.

An exemplary illustration of a process is shown as follows,
Next attempt on—2 Jan. 2017
Original attempt on—2 Jan. 2017
Last attempt on—null
Attempt counter—0
On failure value of 31/32/42, the new record with the remaining fields retains same values as follows,
Next attempt on—3 Jan. 2017
Original attempt on—2 Jan. 2017
Last attempt on—2 Jan. 2017
Attempt counter—1
The attempt counter would keep on increasing if a failure value is returned for the same process again in the same runsequence cycle.

An exemplary illustration of a process is shown as follows,
Next attempt on—3 Jan. 2017
Original attempt on—2 Jan. 2017

Last attempt on—2 Jan. 2017
Attempt counter—1
On failure value of 31/32/42, a new record with the remaining fields retains the same values as follow,
Next attempt on—4 Jan. 2017
Original attempt on—2 Jan. 2017
Last attempt on—3 Jan. 2017
Attempt counter—2

If after failure the job which is scheduled for the next day is successfully executed, the step 2 would be used to calculate the new next attempt on based on the frequency, i.e. using the Original attempt on date.

An exemplary illustration of a process is shown as follows,
Next attempt on—4 Jan. 2017
Original attempt on—2 Jan. 2017
Last attempt on—3 Jan. 2017
Attempt counter—2
On failure value of 31/32/42, a new record with the remaining fields retaining the same values as follow,
Next attempt on—2 Feb. 2017
Original attempt on—2 Feb. 2017
Last attempt on—null
Attempt counter—0

In case the process dependencies are not met as specified in the required_process field—the current process is deferred by 5 days.

An exemplary illustration of a process is shown as follows,
Next attempt on—2 Jan. 2017
Original attempt on—2 Jan. 2017
Last attempt on—null
Attempt counter—0
On failure to meet the required_process satisfaction
Next attempt on—7 Jan. 2017
Original attempt on—2 Jan. 2017
Last attempt on—null
Attempt counter—0

Since the process is not attempted, the attempt counter would remain 0 and the last attempt would remain null.

The role of the process is limited to send back the status 1/2/3 when invoked from the master controller. A status of 1 means still running. A status of 2 means encountering an error, and this is the last heartbeat being sending. A status of 3 means finishing execution successfully and this would be the last heartbeat.

The master controller enriches the status code, when it writes it to the table. If the master controller faces an error while launching the process, possibly due to missing libraries, memory issues, etc., it would record it as error value 31.

If the master controller does not see any heartbeats for one wait period plus one grace period from the process, it would assume that the process has failed and would reschedule the process with an error.

If the process reports a failure, the master controller reschedules the process with an error. If everything goes well, and the process has executed successfully, the master controller reschedules the process with success value of 200.

The master controller would execute all the "non-attempted" processes identified by flag 0 under attempted column for a given family, in terms of their selection. For example, an unprocessed run sequence is identified by flag 0 in the cg_runseq table.

The default stage of the master controller is IDLE when there are no processes with the attempted status for a current unprocessed run sequence. If the master controller finds a process to be launched with the attempted status as 0 for a given run sequence, it would change its state from IDLE to the state as defined by the family.

As long as the master controller is not in an IDLE state, it would listen to a heartbeats table, where the process would write regularly over its lifetime, at an interval specified in the column "expected_wait_time".

A "heartbeat" is a record written by the launched process to the table throughout its lifetime as claimed by it in the column "expected_wait_time". The running state heartbeat is identified by flag "1". At the end of its execution lifetime, the process can exit with a state success after returning the last heartbeat identified by flag "2". In case the process fails during the execution and via an exception or the process feels that it has encountered a problem and it cannot proceed with the expected task successfully, it can exit with a state error after returning the last heartbeat identified by flag "3".

A process needs to be rescheduled when any one of the following outcomes happen in the normal course of execution, including "completion (successful or failed)", "gone rogue (not responding)", and "required process not satisfied".

If the process is successful, it would be scheduled to the next available date from the original attempt date based on the frequency, such as Monthly. The "Original Attempt Date" is the date which remains unchanged for a given run sequence, and is used to compute the "Next Attempt date (identified by column next_attempt_on)"

If a process fails for whatever reason other than required process not completed, it is scheduled to the next day from the current day. This is the next attempt date.

If the required process is not completed for the given process, the process is not even attempted and rescheduled 5 days later from the current date. This is the next attempt date.

If a process is attempted, irrespective of it being a success or failure, the last attempt date would be updated which is the time when the process was executed.

Exemplary running scenarios are illustrated as follow.

1. Running Process for One Off Occasion (or on Demand)

Sometime a process might be executed only once or on demand in the future. In this section the process would be assumed during setup. In that scenario the execution_fruequency value for the process should be kept blank. The process would be executed based on its category and timestamp and would not be rescheduled again.

In the future if the process needs to be executed again, an entry for that process needs to be made for that process in the mc_process_calendar either via inserting statement from Cassandra console by authorized use or administrator screen. Typically, such process belongs to category "Training" but is not limited by category. The process could belong to any category.

2. Handling Process Failures

The master controller would reschedule a process on failure for "d" configurable delay period (by default it is a single day) from the current timestamp.

During the setup run, a process would be executed for "n" times from February 2015 till the time when the next schedule timestamp is greater than the current time stamp as described in section "Master Control Process Execution Strategy".

If a process fails during the setup where each process would be running for "n" times depending on the next_attempt_on date and current timestamp, a human intervention is required because this is a data provided issue. Since this data is provided in bulk for the first time, the master controller would follow the following process, 1. It would reschedule it to "d" configurable delay period of the current timestamp.
2. The original_attempt_on would remain unchanged
3. The next day the master controller would again attempt to run the process and if successful would continue for "n" times from the original_attempt_on date to the timestamp greater than current timestamp If the process fails during the routine course triggered by ingestion of incremental data, it would be called only once. The master controller would follow the similar process as described above except for the next schedule date being greater than the current timestamp.

By default, the master controller would attempt execution of process only three times.

3. Changing the Default Execution Timeline

In situation where a user raises a red flag that data might not be available till the $10^{th}$ of the month, a process might need to be rescheduled via external intervention to the $10^{th}$ of the month instead of default date. This can be done by "Updating" the next execution time (next_attempt_on) via an update statement or admin screen by an authorized user.

In case process default execution time from "$d^{th}$" day has to be changed to "$(d+1)^{th}$" day of the month, the original_attempt_on timestamp needs to be updated as well.

4. Re-running process executed in the past

In case any process has to be rerun without disturbing the execution timeline (next_attempt_on or orginal_attempt_on), the status of the process has to be changed to 0.

For example, the process from December 2015 to current timestamp needs to be re-executed, the master controller changes the status for that record to 0 via an update statement or the admin screen.

5. Changing the Default Reschedule Period for One Off Situations

As discussed previously, a process, on failure, would be rescheduled to be executed on the $(d+1)^{th}$ day from the current timestamp. In case the process wants to control the rescheduled date, a response from the process is manually configured to schedule it to a "process specified" interval rather than the default one.

Figure 5:
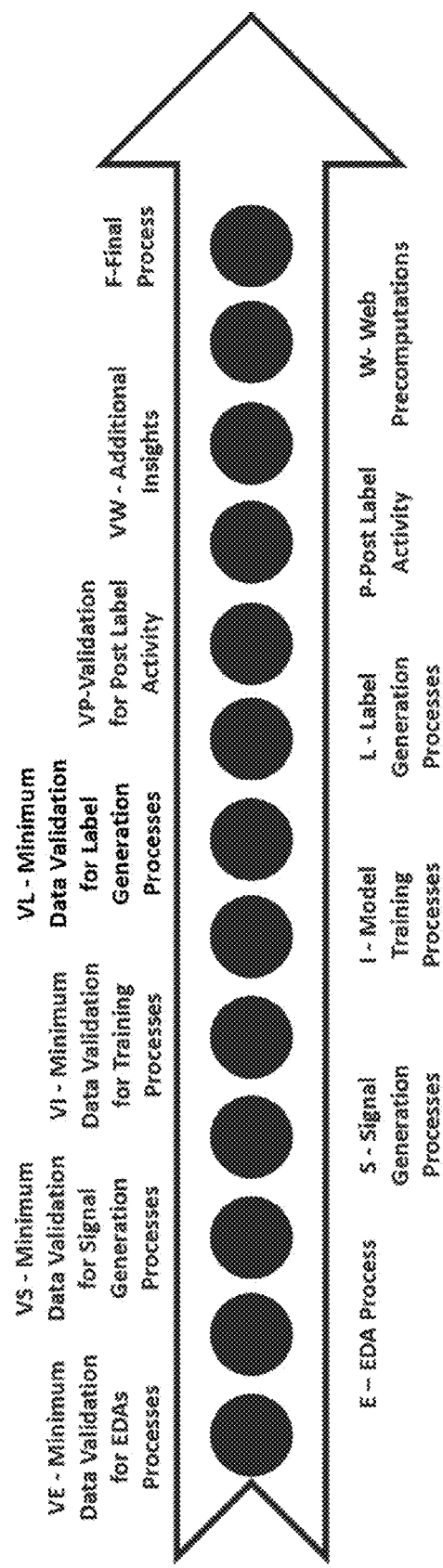
FIG. 5 shows the structure of Run Sequence.

FIG. 5 illustrates the detailed structure of a run sequence of a scheduler logic. A run sequence is a continuous counter for the set of data processed based on the month and year. The present system typically requires 3-5 years of data prior to the current date for model building, and from then a regular input of incremental data. The signals and labels generated are at the month level. The incremental data are pulled via ETL jobs. The ETL processes are executed independently of the master controller. The ETL jobs would pull data from various disparate sources at granularity level, such as monthly till the validation jobs belonging to family VE are satisfied with the data pulled for a given run sequence. Once the validations are confirmed, the ETL processes would not pull any further data for that run sequence. The ETL processes can be manually overridden.

For example, if a user requests customer genomes beginning on December 2017, 36 months of data starting in January 2014 becomes the first month of data with run sequence "0" and from then onwards a run sequence would be incremented for every month till it reaches December 2017 which would be the 35th run sequence. The run sequences would be incremented by one for every monthly incremental input. The run sequences are stored in table cg_runseq in the master controller key space. A snapshot of the columns of cg_runseq is illustrated in Table 6.

TABLE 6

| cg_runseq | run_month | run_year |
|---|---|---|
| 0 | 1 | 2014 |
| 1 | 2 | 2014 |
| 2 | 3 | 2014 |
| ... | ... | ... |
| 35 | 12 | 2017 |

Table 7 lists the family codes that are run to get to the final stage of genome marker generation and consumption. A family consists of multiple related codes, performing a specific function, such as validation and signal generation. The complete list of family codes in order of their selection as shown in FIG. 5 is listed in Table 7.

TABLE 7

| | | |
|---|---|---|
| VE | Validation for Exploratory Data Analysis (EDA) | These are python scripts that would check the imported data for a given month and year |
| E | Exploratory Data Analysis | For every given month and year, EDAs are run which would create derived columns like New Customer Flag |
| VS | Validation for Signals | Before the signal generation (signals are building blocks for labels) a sanity check to validate the input data and derived columns as per VEs and Es for the given run month and run year |
| S | Signals Generation | Python Scripts that would use the input and derived data after validation and generate the signals |
| VI | Validation for Intermediate training | Python scripts to check for the validity of the signal generated for further pre-requisite steps for labels - Training |
| I | Intermediate Training | Once signals are generated and validated, they become our training set to generate performance parameters |
| VL | Validation for Labels | Python scripts to check the adequacy of signals generated for associated labels |
| L | Label Generation | Python process to generated labels from the training parameters and signals |
| VP | Validation for Post Label Activity | A group of labels can be combined to create another label such as "Action Segment", and these are python scripts to validate the adequacy of such labels. |
| P | Post Label Activity | Python scripts to combine labels to generate another label. |
| VW | Validation for Web Scripts | Python script to validate the adequacy of data available as labels |
| W | Web Scripts | Python scripts to generate data for Web Consumption |
| F | Final Process | Final Process to be called after all the family to validate if we can move to next run sequence. |

A process is an independent script written in python, that performs a set of function as required by the process family to which it belongs, such as validation, signal generation, label preparation, web data, etc. from the given set of the data for a given run sequence.

Processes belonging to a family are independent of each other, while there would be dependency of processes on each other across families. For example, E are dependent on VE process.

Each process is given an identifiable process id in the format of family code plus running count (01, 02 . . . ) as illustrated in Table 8.

TABLE 8

| | | |
|---|---|---|
| VS | VS01 | Minimal Data Requirement Validation for S1-Responsive |
| S | S01 | Responsive Signal Generation |
| L | L02 | Diversification Label Generation |
| VW | VW01 | Refresh sales user hierarchy chain for each run sequence |

A success state for a given process is either a success (identified by code 200) or a failure (identified by code 401). Other codes may be used to cover various granular definition of the state for a process after completion.

A final process is a special process written in python, which checks that all the processes scheduled for the run sequence are executed and completed with a success state (200). If all the processes are completed with a success state, the final process may increment the run sequence with one, updating the run month and the run year to the next calendar month and year.

A required process is a process required to be executed beforehand for a process to be eligible for running.

Frequency is the number of times the process needs to be run for a given run sequence. Applicable Frequencies comprise daily, weekly, monthly, quarterly, half-yearly, and yearly.

Unless mentioned specifically, a run sequence means a combination of month and year. A run means the month for which the labels are being generated.

The web application (101) in the data and application server provides a user interface for mainly three kinds of users, including an admin user, marketing user and sales user. An admin user may add, delete, or update customer genome markers via user settings, configure the customer genome system and the interface to external data source via system settings, view system events in real-time including access to system log files via system status, and create action segments.

The user interface for a marketing user comprises portfolio, action segment, my segments and segment detail. The portfolio provides analysis of key metrics of the overall portfolio covering analysis on key metrics, product categories and behavioral markers. The action segment provides a list of segments out of the box defined by the admin user. The marketing user can also create their own marketing segments in my segments using several criteria. These criteria could include raw data points such as transactions or business parameters such as average sales or could include geographic information or could use customer genome markers. The segment detail provides a detailed analysis of a selected segment covering key metrics, profile of an average financial advisor and their behavioral markers.

A sales user may be spoon fed on whom to contact in ranked order and what message would work for the specific financial advisor through the priority advisors. The ranked order is based on a priority algorithm which is ultimately based on top/current business priorities. The portfolio screen may provide the sales user analysis of key metrics of how his list of financial advisors are doing in comparison to the rest of the entire sales organization. The portfolio screen may also provide breakdown of the sales user's portfolio by product categories and analysis by each category. Furthermore, the portfolio advisor may compare and contrast the behavioral markers for the sales user's portfolio with the entire portfolio of financial advisors. The find advisors are analogous to a marketing segment the sales user can find a specific cohort of financial advisors who meet one or more criteria. These criteria could include raw data points such as transactions or business parameters such as average sales or could include geographic information or could use customer genome markers. This subset of financial advisors can then be exported for specific tasks.

The web application (101) may be built using Augular2 to improve the speed, performance and productivity. The web application (101) loads quickly using the component router, which delivers automatic code-splitting so users only load code required to render the view they request. The features of the web application (101) are implemented as separate individual components so as to make testing and code maintenance easy. The web application (101) is independent of any jQuery plugins and Content Deliver Networks (CDNs) and instead uses Node Package Manager (npm) packages.

Figure 6:
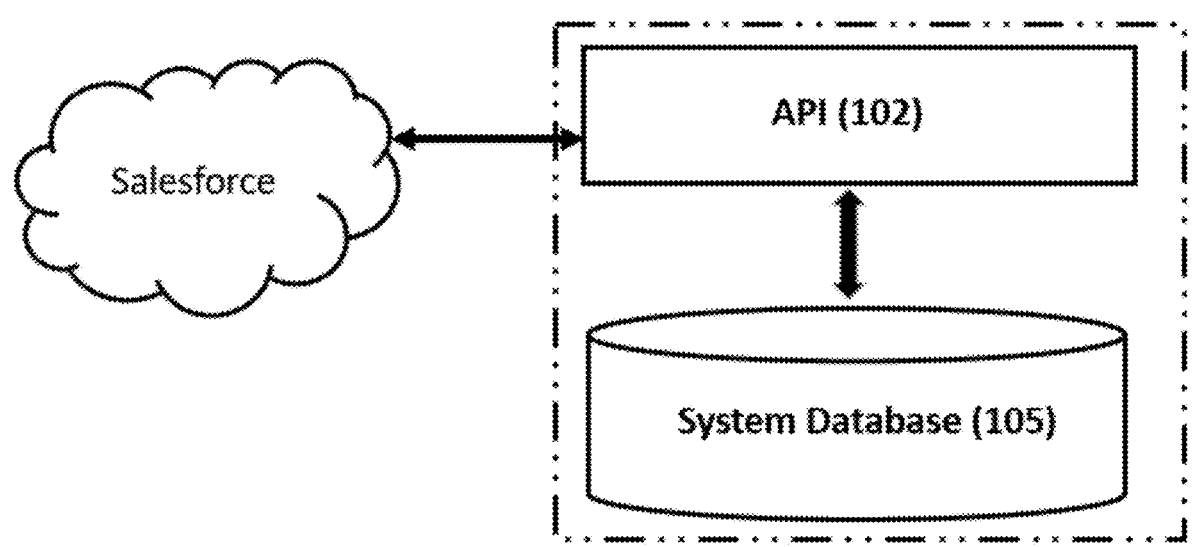
FIG. 6 depicts the details on Salesforce App communicating with the system server via REST API calls.

The API (102) may define the interface with the web application (101) and may be accessible to any external consumer application such as the salesforce implementation. As shown in FIG. 6, the Salesforce App communicates with the system server via API (102) calls. Token based authentication with emails, Salesforce Organization Id, User Na.me may be used for secured connection. Notes and attachments between Salesforce App and the system are automatically synchronized.

Figure 7:
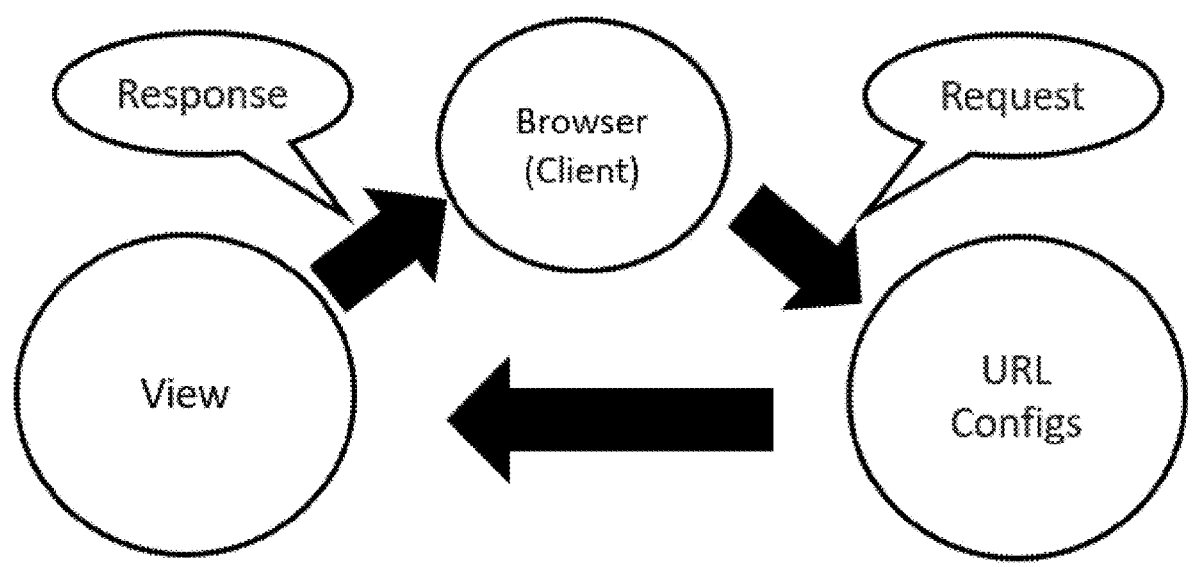
FIG. 7 depicts the details of the Django backend architecture of the API implementation.

API (102) may be implemented using Django web framework in python. FIG. 7 shows the Django backend architecture of the API (102) implementation. A view function, or "view" for short, is simply a Python function that takes a web request and returns a web response. This response can be the HTML contents of a Web page, or a redirect, or a 404 error, or an XML, JSON document, or an image. When a user makes a request for a page on the web application, Django controller takes over to look for the corresponding view via the url.py file, and then return the HTML response or a 404 not found error, if not found.

The data science engine (103) comprises an exploratory data analysis (EDA) module which is configured to generate over 200 insights regarding underlying trends and patterns that exist in data. The EDA is triggered by the master controller. A list of parameterized queries is pre-defined and executed. All EDA is grouped into customer level, firm level and segment level tables in a database.

One of the salient features of the data science engine (103) is the employment of game theory based feature selections to select features that go in as input to the ensemble of deep learning algorithms. The common approach is to push all the features into the deep Learning models. The present invention uses an information-theoretic predictive modeling technique based on the concept of coalition game theory to help select the features, thus overcoming the limitations of traditional feature filter methods. SHapely Additive exPlanations (SHAP) value estimation methods are applied to interpret the model predictions and use the interpretation as another source of feedback.

Figure 8:
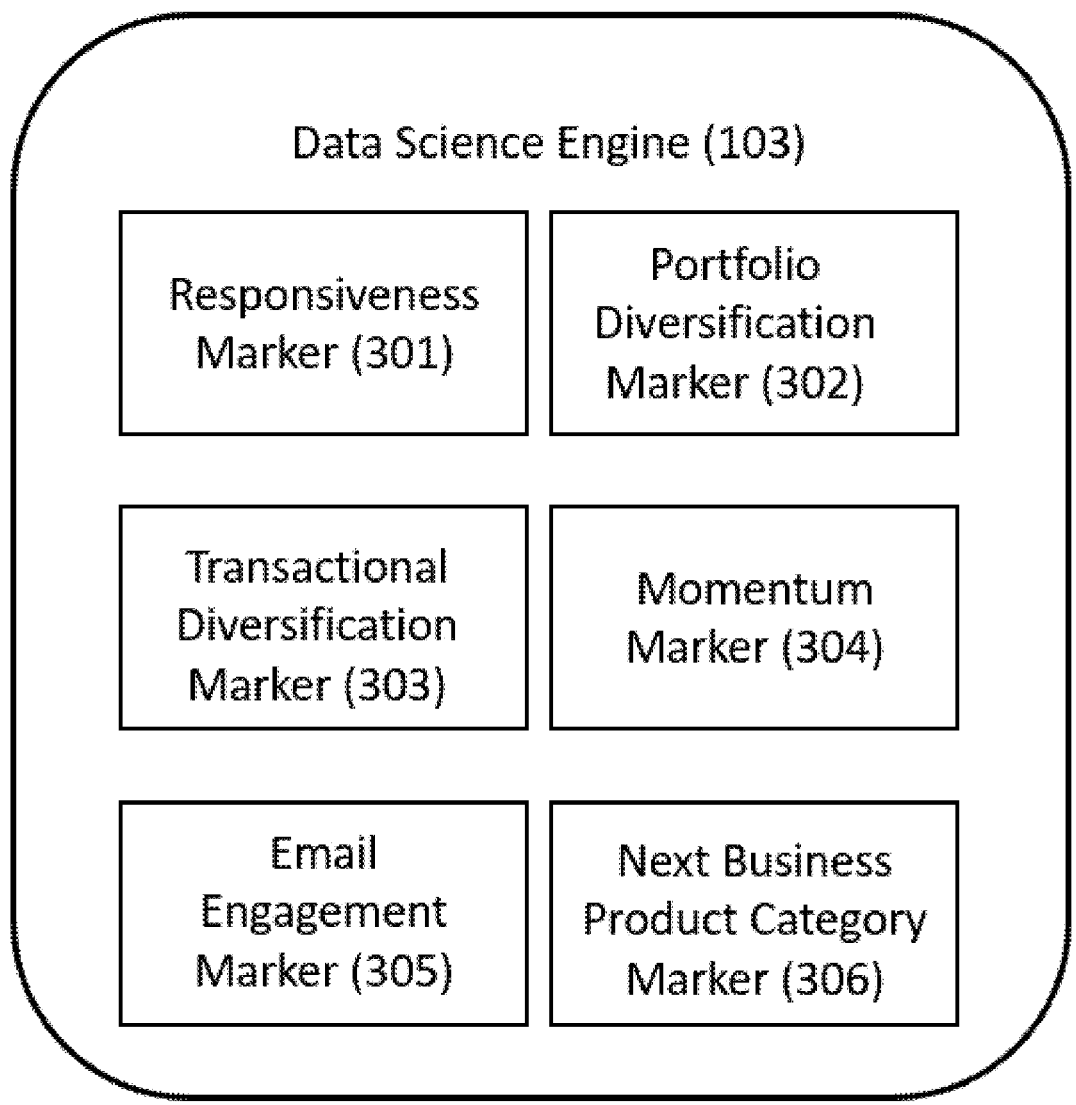
FIG. 8 depicts different customer genome markers created by the Data Science Engine.

The data science engine (103) generates a series of customer genome markers as shown in FIG. 8. The responsiveness marker (301) is an indicator of how individual advisors react in response to funds performing well with respect to their respective benchmark indices under different market conditions, such as growing, declining and neutral. Advisors may react and show responsiveness to fund performance by either investing (buying) in them or by cashing out (redeeming) depending on their investment strategy. Another important aspect that needs to be captured in terms of responsiveness marker is that financial advisors respond differently to different market conditions. The signals for the responsiveness marker include fund performance relative to the Index and Investment Ratio, a ratio of spend in a fund against all funds. The algorithmic approach to develop the responsiveness marker is to create signal 1 for fund performance and signal 2 to study how an advisor has invested in a particular fund. These signals are multiplied and adapted for market conditions.

The portfolio diversification marker (302) is an indicator of advisors' portfolio spread across asset classes (long-term view based on holdings). The portfolio diversification marker (302) is computed by looking at the transactions and holdings of each advisor across the different asset classes and arriving at a metric that best describes or predicts how diversified the investments of an advisors are likely to be. The signals for the portfolio diversification marker include signal 1, a presence signal as follows, $Div_p^i = \Sigma_{\forall j} X_j^{i,t}$ where $X_j^{i,t}=1$ if asset class j exists in the portfolio/transactions for customer i over the last t time periods, else $X_j^{i,t}=0$ and signal 2, a diversification by value signal as follows, $Div_d^i = f(Y_j^{i,t})$, where $Y_j^{i,t}$ is the total AUM under each asset class. t is taken to be equal to 1.

The transactional diversification marker (303) is an indicator of advisors' recent transactional spread across asset classes (short-term view based on recent sales). This is computed by looking at the transactions and holdings of each advisor across the different asset classes and arriving at a metric that best describes or predicts how diversified the investments of an advisors are likely to be. The signals for the transactional diversification marker (303) include signal 1, signal 2 and signal 3. Signal 1 is a presence signal: $Div_p^i = f(X_j^{i,t})$, where $X_j^{i,t}$ is as defined in the previous section. t is taken to be equal to 3 which means the last 3 time periods (months) including the current month will be considered for the calculation. This is done since the transactional behavior of a financial advisor could be dynamic over months. Signal 2 is a diversification by value: $Div_{d1}^i = f(Y_j^{i,t})$, where $Y_j^{i,t}$ is the total transactions by value (gross sales) under each asset class. t is taken to be equal to 3, which means the total gross sales for 3 months will be considered. Signal 3 is a diversification by breadth: $Div_{d2}^i = f(Y_j^{i,t})$, where $Y_j^{i,t}$ is the total number of unique funds bought under each asset class. t is taken to be equal to 3, which means the total number of unique funds over a 3-month window would be considered.

The momentum marker (304) is configured to identify and quantify the growth in transactional terms for every individual advisor, which is done by looking at the value (gross sales and redemptions), volume (number of transactions and breadth of investments) transacted by the advisor. The momentum marker (304) may be used to identify advisors that are likely to become dormant or attrite, to identify advisors that are likely to reach specific sales targets in a specified period and to identify advisors that are in a growth mode and are likely to take up relevant campaigns. The signals for the momentum marker (304) include signal 1, signal 2 and signal 3. Signal 1 (value) is $f(X_{t,i})$, where $X_{t,i}$ refers to the ratio of gross sales or redemption in time-period t by customer i with respect to his/her weighted average of gross sales or redemption over past k-months respectively. Signal 2 (volume) is $Y_{ti}$, where $Y_{ti}$ refers to the number of transaction made in time-period t by customer i. Signal 3 (breadth) is $Z_{ti}$, where $Z_{ti}$ refers to the number additional unique funds added in time-period t by customer i with respect to his/her portfolio of unique funds over a 1-month rolling window. The algorithmic approach to develop the momentum marker (304) follows the state-space model approach, where relevant signals are identified and the latent state of each customer, that is an estimate of the momentum, is tracked across different time periods. The latent state estimates are refined over time by minimizing the error between expected and actual signal values. The signals shall be passed through two separate pre-defined Kalman Filter frameworks (gross sales & redemptions) to obtain the states of positive and negative momentums. The optimization of time-period of training the KF algorithm, re-estimation (or not) of observation matrix, convergence of the algorithm and manipulation of other model parameters need to be ensured at the time of implementation.

The email engagement marker (305) is an indicator of the level of accessibility and comfort each advisor has with the email channel as a means of contact with the organization. The email engagement marker (305) can also be considered as identifying the effectiveness of the email channel towards driving the overall advisor engagement. An advisor with a high level of email engagement upon receiving an email follows up on with a high frequency and in a short period of time. These advisors would therefore be likely to respond well to campaigns sent across the email channel. The signals for the email engagement marker (305) include signal 1 (Open rate), signal 2 (Click rate), and signal 3 (Unsubscription rate). The algorithmic approach to develop the email engagement marker (305) follows the state-space model approach, where relevant signals are identified and the latent state of each customer, that is an estimate of the email engagement, is tracked across different time periods. The latent state estimates are refined over time by minimizing the error between expected and actual signal values. The signals shall be passed through Kalman Filter framework to obtain the state of email engagement.

The next best product category marker (306) is configured to suggest the most appropriate product characteristics that can be suggested to each advisor at any given point of time. The next best product category marker (306) for each advisor is identified by considering the advisor's preferences, past purchase history, product characteristics and external/market context. The suggestion of a next best product for each advisor is dynamic over time and may be different at different points of time for the same advisor. This marker that can be used to pro-actively recommend/offer products (funds) for the advisors to invest. This module will take raw data from the input database containing data according to the specified data schema and the output results would be fed into the marker database. The algorithm approach to develop the next best product category marker (306) uses an ensemble of neural network architectures including CNN (Convolution Neural Network) and MLP (Multi Layer Perceptron).

Table 9 provides the exemplary hardware and software details of the system for profiling and predicting customer behavior.

TABLE 9

|  | Data & Application Server | Deep Learning System |
|---|---|---|
| Hardware | 24 Core CPU<br>96 GB RAM | Minimum 8 Core CPU<br>64 GB RAM<br>NVIDIA Titan X GPU |
| OS | Ubuntu 14 (or above) | Ubuntu 14 (or above) |
| Software | Apache Cassandra 3.10 (or latest) (single instance)<br>Apache Web Server 2.4.25 (or latest)<br>Python3 Anaconda Distribution 2.3.0<br>Numpy 1.13.0<br>Scipy 0.18.1<br>Pandas 0.20.1 | Python3 Anaconda Distribution 2.3.0<br>Numpy 1.13.0<br>Scipy 0.18.1<br>Pandas 0.20.1<br>Tensorflow-gpu 0.12.1<br>Keras 1.2.0 |

TABLE 9-continued

| Data & Application Server | Deep Learning System |
|---|---|
| Tensorflow 0.12.1 | Gensim 1.0.1 |
| Keras 1.2.0 | Cassandra-driver 3.10 |
| Gensim 1.0.1 | |
| Cassandra-driver 3.10 | |

The invention claimed is:

1. A system for profiling and predicting customer behavior, comprising:
a computer server comprising instructions that when executed by one or more processors effectuate operations comprising:
retrieving, via a system database, data points of an entity of a customer from a plurality of data sources for the customer, wherein the entity is selected from a group consisting of transactions, interactions, products, distributors, and funds, wherein the data points of the entity are aggregated weekly, monthly, or quarterly, as prescribed by a user for a target variable;
processing, via a data harmonization engine, the aggregated data points of each entity, and generating an intent-specific harmonized single view of the customer, wherein the intent is selected from a group consisting of customer, product, distributor, and market;
selecting, via a data harmonization engine, a set of features by removing anomalies and outliers according to a plurality of rules defined by a business;
feeding, via a deep learning engine, the features into a deep learning ensemble comprising convolutional neural network (CNN), deep reinforcement learning, and recurrent neural network (RNN), and training the deep learning ensemble to generate a set of customer genome markers defining customer characteristics;
transmitting the customer genome markers to a prediction engine to generate a recommendation for a next best action for a target consumer, wherein the prediction engine uses deep reinforcement learning to penalize or reward itself in case a prediction underperforms or beats a previous prediction cycle;
generating, via the prediction engine, a campaign to the target consumer to drive hyper individual interactions using the next best action for the target consumer;
after the campaign ends, gathering feedback indicating whether the next action has been taken by the target consumer;
retraining the deep learning ensemble using the feedback to learn from mistakes and improve subsequent predictions of the deep learning ensemble;
providing, via a web application and an application program interface (API), a user interface implemented via a web framework comprising a view function that takes a web request by the user, and returns HTM content of a web page, a redirect, a 404 error, an XML, a JSON document, or an image; and
enabling, via a master controller, programmable control of the system database, the data science engine, and the deep learning engine;
wherein the master controller is configured to create a schedule for scheduling data retrieving, transformation, validation, and training.

2. The system of claim 1, wherein the data are grouped by columns by a logical data model and aggregated at a level of granularity.

3. The system of claim 1, wherein a probability score is computed for each genome marker.

4. The system of claim 1, wherein the customer genome markers comprise a responsiveness marker, a portfolio diversification marker, a transactional diversification marker, a momentum marker, an email engagement marker, and a next business product category marker.

5. The system of claim 1, wherein the web application provides a user interface for an admin user, a marketing user and a sales user.

6. The system of claim 5, wherein the user interface for an admin user allows the admin user to add, delete, or update customer genome users via user settings, configure the customer genome system and the interface to external data source via system settings, view system events in real-time including access to system log files via system status, and create action segments.

7. The system of claim 5, wherein the user interface for a marketing user comprises portfolio, action segment, mysegments and segment detail.

8. The system of claim 7, wherein the portfolio is executed by the processors to provide analysis of key metrics of an overall portfolio covering analysis on key metrics, product categories and customer genome markers.

9. The system of claim 7, wherein the action segment is executed by the processors to provide a list of segments defined by the admin user.

10. The system of claim 7, wherein the mysegments is executed by the processors to create the marketing user's own marketing segments.

11. The system of claim 7, wherein the segment detail is executed by the processors to provide a detailed analysis of a selected segment covering key metrics, profile of an average financial advisor and the financial advisor's behavioral markers.

12. The system of claim 5, wherein the user interface for a sales user comprises a ranked order, a portfolio screen, a portfolio advisor, and find advisors.

13. The system of claim 12, wherein the ranked order is based on a priority algorithm which is ultimately based on top/current business priorities.

14. The system of claim 12, wherein the portfolio screen is executed by the processors to provide analysis of key metrics of the sales user's list of financial advisors in comparison to the rest of an entire sales organization.

15. The system of claim 12, wherein the portfolio screen is executed by the processors to provide breakdown of the sales user's portfolio by product categories and analysis by each category.

16. The system of claim 12, wherein the portfolio advisor is executed by the processors to compare and contrast the customer genome markers for the sales user's portfolio with an entire portfolio of the Financial advisors.

17. The system of claim 12, wherein the find Advisors are executed by the processors to locate a specific cohort of financial advisors who meet one or more criteria, wherein the criteria comprise raw data points such as transactions, business parameters such as average sales, geographic information, and customer genome markers.

18. The system of claim 1, wherein the web application is executed by the processors to load data using a component router, which delivers automatic code-splitting so users only load code required to render a view they request.

19. The system of claim 1, wherein the API is executed by the processors to communicate with a Salesforce App.

20. The system of claim 1, wherein data science engine comprises an exploratory data analysis (EDA) module configured to generate over 200 insights regarding underlying trends and patterns that exist in data.

21. A method for profiling and predicting customer behavior implemented by a computer server comprising instructions that when executed, effectuate operations comprising, comprising:
- retrieving, via a system database, data points of an entity of a customer from a plurality of data sources for the customer, wherein the entity is selected from a group consisting of transactions, interactions, products, distributors, and funds, wherein the data points of the entity are aggregated weekly, monthly, or quarterly, as prescribed by a user for a target variable;
- processing, via a data harmonization engine, the aggregated data points of each entity, and generating an intent-specific harmonized single view of the customer, wherein the intent is selected from a group consisting of customer, product, distributor, and market;
- selecting, via a data harmonization engine, a set of features by removing anomalies and outliers according to a plurality of rules defined by a business;
- feeding, via a deep learning engine, the subset of standardized features into a deep learning ensemble comprising convolutional neural network (CNN), deep reinforcement learning, and recurrent neural network (RNN), and training the deep learning ensemble to generate a set of customer genome markers defining customer characteristics;
- transmitting the customer genome markers to a prediction engine to generate a recommendation for a next best action for a target consumer, wherein the prediction engine uses deep reinforcement learning to penalize or reward itself in case a prediction underperforms or beats a previous prediction cycle;
- generating, via the prediction engine, a campaign to the target consumer to drive hyper individual interactions using the next best action for the target consumer;
- after the campaign ends, gathering feedback indicating whether the next action has been taken by the target consumer;
- retraining the deep learning ensemble using the feedback to learn from mistakes and improve subsequent predictions of the deep learning ensemble;
- providing, via a web application and an application program interface (API), a user interface implemented via a web framework comprising a view function that takes a web request by the user, and returns HTM content of a web page, a redirect, a 404 error, an XML, a JSON document, or an image; and
- enabling, via a master controller, programmable control of the system database, the data science engine, and the deep learning engine;
- wherein the master controller is configured to create a schedule for scheduling data retrieving, transformation, validation, and training.

* * * * *